Patented Mar. 8, 1938

2,110,826

UNITED STATES PATENT OFFICE 2,110,826

ANESTHETIC SOLUTIONS AND MIXTURES FOR PREPARING SAME

David Curtis, New York, N. Y.

No Drawing. Application June 25, 1935, Serial No. 28,267

11 Claims. (Cl. 167—52)

The present invention relates to anesthetic mixtures suitable for use for surface and local anesthetics for hypodermic injections, more particularly to such mixtures containing procaine salts, and it has for its object to provide anesthetic mixtures of the character described in which certain of the fruit acid salts of procaine, notably citric and malic acid salts of procaine, are used.

It is also an object of the present invention to provide mixtures containing the component substances of the aforesaid fruit acid salts of procaine in predetermined proportions, so that when such component substances are dissolved, the desired fruit acid salts of procaine are formed in the solution.

In compounding local anesthetics for hypodermic injection it is desirable to have the resultant anesthetic approach, in solution, the neutral point on the pH scale, so as to insure its compatibility with the tissue cells and fluids. It is also desirable that its anesthetic effect be rapid and profound. It is further desirable that the anesthetic mixture which also ordinarily contains epinephrine or other vaso constrictors which oxidize rapidly, remain stable in solution, without decomposing the epinephrine.

I have found that a mixture of the heaviest procaine salts of citric and malic acids, together with a small amount of mono-procaine tartrate, in solution, conforms most nearly to all the above requirements with respect to compatibility, effectiveness and stability with epinephrine.

Furthermore, the presence of the fruit acids in the solution give it an agreeable flavor and taste, which make the solution highly agreeable as a mild surface anesthetic for oral and nasal use.

Tri-procaine citrate or tri-citricaine, is the heaviest salt of procaine base with citric acid, has already been described in my co-pending application, Serial No. 26,037, filed June 11, 1935. It is a white, crystalline powder of a molecular weight of 900.11. Its formula is:

$$3[C_6H_4.NH_2.COO.C_2H_4N(C_2H_5)_2]$$
$$COOH.CH_2.C(OH)(COOH)CH_2.COOH,$$

and is known as tri[diethyl amino ethanol-para-amino benzoate]-oxytricarbollylate. A 2% solution of it shows a pH of 6.9 to 7.0 bromthymol blue as indicator, LaMotte color chart comparator), and is alkaline to litmus paper.

Di-procaine malate, or di-malicaine, the heaviest procaine salt of malic acid, represents a chemical union of two molecular equivalents of procaine base and one molecular equivalent of malic acid, and has a molecular weight of 606.14. This procaine salt, which I discovered, has the formula of $$2[C_6H_4.NH_2.COO.C_2H_4N(C_2H_5)_2]$$
$$COOH.CH_2.CH.OH.COOH,$$

and is to be known as di[diethyl amino ethanol-para- amino benzoate] oxysuccinate. It is a yellowish crystalline powder of low melting point. A 2% solution of it indicates a pH of 6.7 (as above) and is alkaline to litmus paper.

Mono-procaine tartrate, or mono-tartacaine, represents the chemical union of unimolecular equivalents of procaine base and tartaric acid. It has a molecular weight of 386.07. Its formula is $$[C_6H_4.NH_2.COO.C_2H_4N(C_2H_5)_2]$$
$$.C_2H_2(OH)_2(COOH)_2,$$

and is to be known as mono-[diethyl amino ethanol-para-amino benzoate] tartrate. It is a resinous substance soft and tacky at room temperature. A 2% solution of it as base, equivalent to 3.21% of the salt, gives a pH of 4.4 (methyl red as indicator, LaMotte color chart). The salt is an anesthetic substance itself.

A mixture of the tri-citricaine and di-malicaine, in 2% solution, registers a pH of 6.7 to 7.0, depending on the proportion of each used. A mixture of equal parts of each in a 2% solution, which is generally desirable for use, registers a pH of 6.7 to 6.8, and is alkaline to litmus paper.

I have found that the addition of mono-tartacaine, which is also an anesthetic fruit acid salt, when added in small proportion to the above mixture, gives a solution of it with epinephrine, which is generally an important constituent of local anesthetics, greater stability and freedom from discoloration.

A 2% solution of the three fruit acid procaines, composed of 0.9% of tri-citricaine, 0.9% di-malicaine and 0.2% mono-tartacaine, registers a pH of 6.0, which is within the critical acid value of blood (pH 5.6) and therefore still compatible with the tissue cells and fluids. When the above solution was added to an equal volume of normal horse blood serum of pH 7.3, the resultant mixture registered a pH of 6.8 and was definitely alkaline to litmus paper, indicating again the compatibility of this anesthetic mixture with the tissue cells and fluids.

Upon the addition of epinephrine to the above anesthetic mixture in solution, it showed a stability as indicated by freedom from discoloration, for a period of twenty four hours, at least.

An anesthetic mixture of this type, because of its stability in solution in the presence of epinephrine or other vaso-constricting agents that are unstable, is of great therapeutic value in that it avoids the possibility of injecting a deteriorated solution into the body. It also has great economic and time saving advantages for physicians and dentists who prefer to use base powders or tablets to make up their own anesthetic solutions. By using a mixture of the above fruit acid procaines in a prepared powder or tablet base, they can make up one solution which will be suitable for use for the entire operative day, and will not have to waste time and materials to make up fresh solutions every few hours during the operative day.

The mono-tartacaine acts in the above mixture not only as a stabilizer for the epinephrine, but also for the di-malicaine, which is normally subject to oxidation.

This mixture of fruit acid procaine salts constitutes a very effective local anesthetic in solution, giving very rapid and profound anesthesia. These anesthetic qualities of the mixture may be explained by the high molecular weights of the tri-citricaine and the di-malicaine which preponderate in the mixture, and by the fact that these poly-procaine salts are salts of weak acids and so hydrolyze in solution to a large extent, liberating more of the base procaine, the active principle of the anesthetic. This hydrolysis also accounts for the high pH value of tri-citricaine and di-malicaine in solution.

All of the above procaine salts may be conveniently prepared to be incorporated in a mixture in base powder or tablets, such as are sold on the market, which also may contain a vaso-constrictor, as epinephrine, anti-oxidants of either alkaline or acid reaction, and other ingredients used in connection with anesthetic solutions. For that purpose pure tri-citricaine, di-malicaine and mono-tartacaine may be prepared by combining in a suitable organic solvent the predetermined molecular quantities of procaine base and the respective fruit acids, and then removing the salt produced from the solution in the usual manner.

Commercial anesthetic solutions containing a mixture of the above three fruit acid salts of procaine may be conveniently prepared by dissolving in a convenient volume of water, preferably distilled water, predetermined quantities of procaine base with the requisite proportional quantities of the respective acids, preferably a separate solution for each salt, the liquid brought to a boil and the ingredients stirred until their solution is effected. All of the three solutions are then brought together, and the other constituents, such as epinephrine and anti-oxidant and physiological salt added, the solution suitably filtered and then diluted to the desired concentration, and finally bottled in in any of the usual containers.

For the above method of preparing the anesthetic solutions of the present invention, dry mixtures of procaine base with the proper proportions of each of the fruit acids used, or with all of them, may be commercially prepared, ready for dissolving in water. Such dry mixtures constitute the least expensive and least complicated way for preparing the anesthetic solutions.

The mixture of these three procaine salts is compatible not only with epinephrine, but also with any other vaso-constrictor belonging to the epinephrine and the ephedrine groups.

It may here be stated that where the mixture of fruit acid salts of procaine is prepared for immediate use in solution, without any anti-oxidants for the vaso-constrictor, a proportion of between 5 and 15 percent of mono-procaine tartrate, with respect to the total weight of the anesthetic salt, is desirable; substantially 10 per cent being preferred as giving the pH of about 6.0. However, where the mixture of the procaine salts or of their solution is prepared for commercial purposes, when it may have to stand up without deterioration for a long period of time, a higher proportion of the mono-procaine tartrate is desirable, to preserve the procaine malate and to keep the solution stable, especially where the anti-oxidant used for the preservation of the epinephrine is of an alkaline reaction. Under the last condition a proportion of as high as one third, by weight, of mono-procaine tartrate will give useful results.

This completes the description of the composition of the anesthetic mixture of the present invention, its use and method of composition. While I have given specific examples of the anesthetic mixture, it is to be understood that I do not wish to be limited to such examples, as, obviously, many variations may be made within the spirit and scope of the present invention and without the use of the inventive faculties.

What I claim is:

1. As a new composition of matter, an anesthetic solution containing tri-procaine citrate, di-procaine malate and mono-procaine tartrate the mono-procaine tartrate constituting from between 5 and 50 percent by weight of the combined quantity of the other two salts.

2. As a new composition of matter, an anesthetic solution containing tri-procaine citrate, di-procaine malate, mono-procaine tartrate, the mono-procaine tartrate constituting from between 5 and 50 percent by weight of the combined quantity of the other two salts, a vaso-constrictor and physiologic salt.

3. As a new composition of matter, an anesthetic solution containing tri-procaine citrate, di-procaine malate, mono-procaine tartrate, the mono-procaine tartrate constituting from between 5 and 50 percent by weight of the combined quantity of the other two salts, a vaso-constrictor, an anti-oxidant and physiologic salt.

4. As a new composition of matter, an anesthetic solution containing substantially 0.9% by weight of tri-procaine citrate, 0.9% di-procaine malate, 0.2% of mono-procaine tartrate, 1:35,000 of epinephrine, 0.8 to 0.9% of sodium chloride, and about 0.1% of sodium sulphite or sodium bisulphite.

5. As a new composition of matter, a mixture of fruit acid salts of procaine adapted to be dissolved in water to form an anesthetic solution, containing tri-procaine citrate, di-procaine malate and mono-procaine tartrate the mono-procaine tartrate constituting from between 5 to 50 percent by weight of the combined quantity of the other two salts.

6. As a new composition of matter, a mixture of fruit acid salts of procaine adapted to be dissolved in water to form an anesthetic solution, containing tri-procaine citrate, di-procaine malate, mono-procaine tartrate, the mono-procaine tartrate constituting from between 5 and 50 percent by weight of the combined quantity of the other two salts, a vaso-constrictor and physiologic salt.

7. As a new composition of matter, a mixture of fruit acid salts of procaine adapted to be dissolved in water to form an anesthetic solution, containing tri-procaine citrate, di-procaine malate, mono-procaine tartrate, the mono-procaine tartrate constituting from between 5 and 50 percent by weight of the combined quantity of the other two salts, a vaso-constrictor, an anti-oxidant and physiologic salt.

8. As a new composition of matter, a mixture of fruit acid salts of procaine adapted to be dissolved in water to form an anesthetic solution containing tri-procaine citrate, di-procaine malate and mono-procaine tartrate, the mono-procaine tartrate constituting substantially from 5% to 15% by weight of the combined quantities of the other two, together with a vaso-constrictor epinephrine, substantially 0.15% of an anti-oxidant, and 0.8% to 0.9% of sodium chloride.

9. As a new composition of matter, an anesthetic mixture containing procaine base in chemical combination with citric and malic acids as tri-procaine citrate and di-procaine malate, and a procaine compound of tartaric acid in which the procaine molecule is linked to a replaceable hydrogen of the tartaric acid, making it a mono-procaine tartrate compound the mono-procaine tartrate compound being present in proportion of between 5 and 50 percent by weight of the combined quantity of the other two salts.

10. As a new composition of matter, a mixture containing procaine base, malic, citric and tartaric acid, adapted to be dissolved in water to form an anesthetic solution, the fruit acids and procaine base being in such proportions to yield, in solution, from between 50 and 95 percent of the mixture of di-procaine malate and tri-procaine citrate and from between 50 and 5 percent, respectively, of mono-procaine tartrate.

11. As a new composition of matter, a mixture containing procaine base, malic, citric and tartaric acids, a vaso constrictor and an anti-oxidant, adapted to be dissolved in water to form an anesthetic solution, the said procaine base, fruit acids and anti-oxidant being contained in such proportions to yield an anesthetic solution from between 50 and 95 percent of the mixture of di-procaine malate and tri-procaine citrate and from between 50 and 5 percent, respectively, of mono-procaine tartrate.

DAVID CURTIS.